US007885757B2

(12) United States Patent
Yamaguchi

(10) Patent No.: US 7,885,757 B2
(45) Date of Patent: Feb. 8, 2011

(54) DEGRADATION DETERMINATION APPARATUS AND DEGRADATION DETERMINATION SYSTEM FOR OXYGEN CONCENTRATION SENSOR

(75) Inventor: Masahiko Yamaguchi, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 22 days.

(21) Appl. No.: 12/416,296

(22) Filed: Apr. 1, 2009

(65) Prior Publication Data

US 2009/0259390 A1 Oct. 15, 2009

(30) Foreign Application Priority Data

Apr. 2, 2008 (JP) ............................. 2008-096005

(51) Int. Cl.
*G06F 17/10* (2006.01)

(52) U.S. Cl. ....................... 701/109; 123/688; 123/443; 73/114.73

(58) Field of Classification Search ................. 123/688, 123/443, 695, 696, 674, 693, 694; 701/109, 701/114, 119, 102, 103, 104; 73/114.73, 73/114.69, 114.71, 114.75
See application file for complete search history.

(56) References Cited

U.S. PATENT DOCUMENTS 5,851,376 A * 12/1998 Nishioka et al. ......... 205/784.5
6,799,419 B2 * 10/2004 Rosel et al. .................... 60/277
7,444,235 B2 * 10/2008 Anilovich et al. ........... 701/114
7,499,792 B2 * 3/2009 Rosel et al. ................. 701/114
7,558,667 B2 * 7/2009 Kida .......................... 701/114
7,720,595 B2 * 5/2010 Iwazaki ...................... 701/114

FOREIGN PATENT DOCUMENTS

JP 01-155257 6/1989
JP 04-365950 12/1992

* cited by examiner

*Primary Examiner*—Stephen K Cronin
*Assistant Examiner*—Raza Najmuddin
(74) *Attorney, Agent, or Firm*—Nixon & Vanderhye PC

(57) ABSTRACT

There is provided a dither control means that performs a dither control, which compulsively changes an air-fuel ratio alternately to rich side and to lean side by increasing and decreasing fuel injection quantity of an injector (fuel injection valve) in a stepped manner. A predicted value (ideal A/F value ID), which indicates an ideal change of a detection value of an A/F sensor (oxygen concentration sensor) in a case where the A/F sensor is not degraded, is set as a standard value. Then, an integral of a difference between the detection value of the A/F sensor, which changes in accordance with the dither control, and the standard value is calculated. If a calculated value of the integral is larger than a predetermined value, it is determined that the A/F sensor is degraded.

4 Claims, 5 Drawing Sheets

TARGET A/F
t0
t10
t20
t30
t40
t50
t60
LEAN
RICH
LEAN
RICH
LEAN

ID (IDEAL A/F)
NORMAL
L1
L2
L3
R1
R2
R3
DETECTED A/F
t11
t12
t15
t21
t22
t25
t31
t35
t41
t45
t51
t55
t61
t65

ID (IDEAL A/F)
DELAY ABNORMAL
DETECTED A/F
t11
t13
t15
t21
t23
t25
t31
t35
t41
t45
t51
t55
t61
t65

ID (IDEAL A/F)
RESPONSE ABNORMAL
DETECTED A/F
t11
t15
t21
t25
t31
t35
t41
t45
t51
t55
t61
t65

DEGRADATION DETERMINATION APPARATUS AND DEGRADATION DETERMINATION SYSTEM FOR OXYGEN CONCENTRATION SENSOR

CROSS REFERENCE TO RELATED APPLICATION

This application is based on and incorporates herein by reference Japanese Patent Application No. 2008-096005 filed on Apr. 2, 2008.

BACKGROUND OF THE INVENTION

1. Field of the Invention

The present invention relates to an apparatus for determining presence and absence of degradation of an oxygen concentration sensor for detecting oxygen concentration in exhaust gas.

2. Description of Related Art

Conventionally a technology is known in which fuel injection quantity is adjusted by feedback control so as to equalize an air-fuel ratio, which is calculated from a detection value of an oxygen concentration sensor, to a target air-fuel ratio. The oxygen concentration sensor detects oxygen concentration in exhaust gas emitted from an internal combustion engine. The air-fuel ratio (a ratio between air and fuel in burned air-fuel mixture) is calculated based on the detection value of the oxygen concentration sensor. In such an internal combustion engine, detection accuracy of the oxygen concentration sensor greatly influences emission amount control. Therefore, it is important to determine degradation of the oxygen concentration sensor with sufficient accuracy.

A detection apparatus described in JP4-365950, which performs such a determination of degradation, performs a dither control, which compulsively changes the air-fuel ratio alternately to rich side and to lean side by controlling fuel injection quantity. If a response time from when the dither control is started to when a change appears in the detection value of the oxygen concentration sensor (that is, to when the detection value exceeds a threshold value) is longer than a predetermined time, it is determined that the oxygen concentration sensor is degraded.

However, in this kind of common oxygen concentration sensor, the detection value compulsively changed by the dither control is accompanied by large fluctuation due to noises etc. Therefore, the detection value can momentarily exceed the threshold value due to the noises just after the dither control is started. Accordingly, the above-mentioned response time is shortened, so that no degradation can be determined though the oxygen concentration sensor is actually degraded.

SUMMARY OF THE INVENTION

The present invention is made in view of the above-mentioned problem. Thus, it is an objective of the present invention to provide a degradation determination apparatus and a degradation determination system for an oxygen concentration sensor, in which accuracy of determination is improved in determining presence and absence of degradation of the oxygen concentration sensor.

To achieve the objective of the present invention, there is provided a degradation determination apparatus for an oxygen concentration sensor. The degradation determination apparatus for the oxygen concentration sensor is applied in an internal combustion engine, which has a fuel injection valve for injecting fuel used for combustion and the oxygen concentration sensor for detecting oxygen concentration in exhaust gas, and performs a feedback control of fuel injection quantity of the fuel injection valve to equalize an air-fuel ratio, which is calculated from a detection value of the oxygen concentration sensor, with a target air-fuel ratio. The degradation determination apparatus for the oxygen concentration sensor includes a dither control means, an integral calculation means and a degradation determination means. The dither control means performs a dither control, which compulsively changes the air-fuel ratio alternately to rich side and to lean side, by controlling the fuel injection quantity of the fuel injection valve. The integral calculation means calculates an integral of a difference between the detection value of the oxygen concentration sensor, which changes in accordance with the dither control, and a standard value of the detection value. The degradation determination means determines presence and absence of degradation of the oxygen concentration sensor based on a value of the integral calculated by the integral calculation means.

As mentioned above, in the conventional apparatus that determines degradation based on a response time until the detection value exceeds a threshold value, the response time that affects the result of determination of degradation of the oxygen concentration sensor is greatly influenced by noises. Compared with the conventional apparatus, the above-mentioned present invention calculates the integral of the difference between the detection value of the oxygen concentration sensor, which changes in accordance with the dither control, and the standard value, and determines presence and absence of degradation of the oxygen concentration sensor based on the calculated value of the integral. The calculated value of the integral, which affects the result of determination of degradation of the oxygen concentration sensor, is hardly influenced by noises. Therefore, in determining presence and absence of degradation of the oxygen concentration sensor, it is possible to improve an accuracy of the determination.

The above-mentioned standard value may be a previously memorized predicted value (see dotted-lines ID in FIGS. 2B-2D) that indicates an ideal change of the detection value generated by the dither control. In this case, if the oxygen concentration sensor is degraded, the difference between the detection value, which changes in accordance with the dither control, and the predicted value, which indicates an ideal change, is remarkably increased, and the value of the integral is remarkably increased, too. Therefore, it is possible to desirably improve the accuracy of the determination of degradation.

The above-mentioned standard value may be set as follows. That is, the target air-fuel ratio just before performing the dither control may be set as the standard value. Instead, a minimum value or a maximum value (see the dotted lines Bmin, Bmax in FIGS. 4B-4D) of the detection value in a time period from when the dither control is started to when the integral calculation means starts calculating the integral may be set as the standard value. Furthermore, the detection value (see dotted-lines BL, BR in FIGS. 5B-5D) when the integral calculation means starts calculating the integral may be set as the standard value.

Depending on a kind of the oxygen concentration sensor, a response delay caused by degradation may remarkably appear when the air-fuel ratio changes from the rich side to the lean side (in leaning time), and the response delay caused by degradation may remarkably appear when the air-fuel ratio changes from the lean side to the rich side (in richening time). Focusing attention on this point, the integral calculation means may be configured to have at least one of a lean response calculation means, which calculates the integral of the difference in a time period where the air-fuel ratio changes from the rich side to the lean-side, and a rich response calculation means, which calculates the integral of the difference in a time period where the air-fuel ratio changes from the lean side to the rich side.

In this case, depending on whether the response delay caused by degradation remarkably appears in the leaning time or in the richening time, it is possible to select a suitable calculated value from among the integral value calculated by the lean response calculation means and the integral value calculated by the rich response calculation means. Therefore, the degradation determination means can determine degradation based on the selected integral value.

For example, if it is previously known that the response delay caused by degradation remarkably appears in the leaning time, it is possible to perform the determination of degradation based on the integral value calculated by the lean response calculation means. In this case, it is possible to improve the accuracy of the determination compared with a case in which the determination of degradation is performed based on the integral values calculated by both calculation means. In an analogous fashion, if it is previously known that the response delay caused by degradation remarkably appears in the richening time, it is possible to perform the determination of degradation based on the integral value calculated by the rich response calculation means. Accordingly, it is possible to improve the accuracy of determination. Furthermore, if it is previously known that the response delay caused by degradation appears to a similar extent in both of the leaning time and the richening time, it is possible to perform the determination of degradation based on both integral values calculated by both calculation means. In this manner, it is possible to improve the accuracy of the determination.

A calculated value of the integral changes in accordance with degradation of the oxygen concentration sensor. A magnitude of the change of the calculated value of the integral depends on a setting of an integration interval. It is possible to enhance the accuracy of the determination of degradation by setting the integration interval such that the calculated value of the integral greatly changes in accordance with degradation. However, such a desirable integration interval changes in accordance with a running state of the internal combustion engine (such as a load of the internal combustion engine based on an accelerator operation amount etc. and a rotational speed of an output shaft of the internal combustion engine). In view of this point, the above-mentioned integral calculation means may be configured to variably set the integration interval for calculating the integral of the detection value in accordance with the running state of the internal combustion engine (such as the above-mentioned load and the rotational speed). In this case, the integration interval is variably set so that the calculated value of the integral would greatly change in accordance with the degradation of the oxygen concentration sensor. Therefore, it is possible to enhance the accuracy of the determination of degradation.

There is also provided another degradation determination apparatus for an oxygen concentration sensor. The degradation determination apparatus for the oxygen concentration sensor is applied in an internal combustion engine, which has a fuel injection valve for injecting fuel used for combustion and the oxygen concentration sensor for detecting oxygen concentration in exhaust gas, and performs a feedback control of fuel injection quantity of the fuel injection valve to equalize an air-fuel ratio, which is calculated from a detection value of the oxygen concentration sensor, with a target air-fuel ratio. The degradation determination apparatus for the oxygen concentration sensor includes a dither control means, a memorizing means and a degradation determination means. The dither control means performs a dither control, which compulsively changes the air-fuel ratio alternately to rich side and to lean side, by controlling the fuel injection quantity of the fuel injection valve. The memorizing means previously memorizes a predicted value that indicates an ideal change of the detection value generated by the dither control. The degradation determination means determines presence and absence of degradation of the oxygen concentration sensor based on a difference between the detection value, which changes in accordance with the dither control, and the predicted value.

In this case, the predicted value, which indicates the ideal change of the detection value caused by the dither control, is previously memorized, and presence and absence of degradation of the oxygen concentration sensor is determined based on the difference between the detection value, which changes in accordance with the dither control, and the predicted value. Therefore, it is possible to enhance the accuracy of the determination of degradation compared with a conventional apparatus that determines degradation based on a response time until the detection value exceeds a threshold value.

There is also provided a degradation determination system for an oxygen concentration sensor. The degradation determination system for the oxygen concentration sensor has a fuel injection valve that injects fuel used for combustion, the oxygen concentration sensor that detects oxygen concentration in exhaust gas, and the above-mentioned degradation determination apparatus. This degradation determination system produces the above-mentioned effects in an analogous fashion.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

Figure 1:
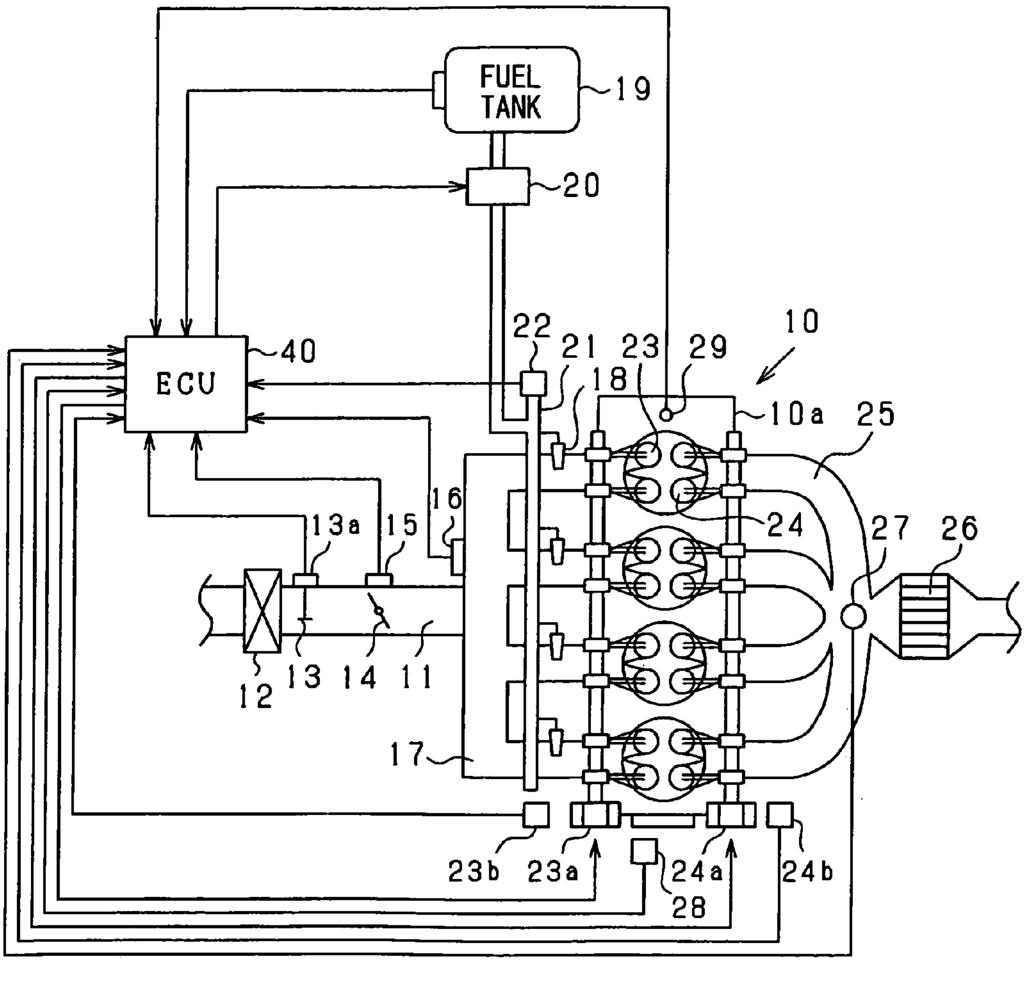
FIG. 1 is a diagram schematically showing an entire configuration of an engine control system in which a degradation determination apparatus for an oxygen concentration sensor according to a first embodiment of the present invention is applied.

Embodiments in which the present invention is given a concrete form will be described hereafter based on drawings. The same reference numeral is assigned to the same or equivalent parts across the following embodiments.

First Embodiment

A first embodiment, in which a degradation determination apparatus for an oxygen concentration sensor according to the present invention is applied in an oxygen concentration sensor provided for an internal combustion engine of a vehicle, will be described hereafter. In this embodiment, a four-wheeled vehicle that has a gasoline engine, which is an internal combustion engine, as a driving power source is targeted. First, an outline of an entire construction of an engine control system, which has the engine and an electronic control unit (hereafter referred to as an ECU) as main constituents, will be described with reference to FIG. 1.

In the engine 10 shown in FIG. 1, an air cleaner 12 is installed at a most upstream part of an intake pipe 11, and an air flow meter 13 for detecting intake air quantity is installed on a downstream side of this air cleaner 12. This air flow meter 13 incorporates an intake air temperature sensor 13*a* for detecting temperature of intake air. A throttle valve 14, of which an opening degree is adjusted by an actuator such as a DC motor, and a throttle valve opening degree sensor 15 for detecting an opening degree of the throttle valve are installed on a downstream side of the air flow meter 13.

An intake pipe pressure sensor 16 for detecting pressure in the intake pipe is installed on a downstream side of the throttle valve 14 in the intake pipe 11. The engine 10 is a multi-cylinder engine. An intake manifold 17, which introduces air into each cylinder of the engine 10, is connected to a downstream side of the intake pipe pressure sensor 16 in the intake pipe 11. Electromagnetically driven injectors 18 (fuel injection valves) for injecting and supplying fuel are attached to the intake manifold 17 in proximity to intake ports of cylinders, respectively.

The fuel in a fuel tank 19 mounted on the vehicle is supplied to a delivery pipe 21 (fuel piping) by a fuel pump 20, and is distributed and supplied from the delivery pipe 21 to each injector 18. A fuel temperature sensor 22 for detecting temperature of fuel is attached to the delivery pipe 21. An intake valve 23 and an exhaust valve 24 are installed in the intake port and an exhaust port of the engine 10, respectively. Air-fuel mixture is introduced into a combustion chamber by an opening action of the intake valve 23, and exhaust gas after combustion is discharged to an exhaust manifold 25 by an opening action of the exhaust valve 24.

A catalyst device 26 such as a three-way catalyst for cleaning up CO, HC, NOx, etc. in exhaust gas is installed at a part, which is positioned on a downstream side of the exhaust manifold 25 and in which the exhaust gas from respective cylinders gather. An A/F sensor 27 (oxygen concentration sensor) for detecting oxygen concentration in exhaust gas is installed on an upstream side of this catalyst apparatus 26. The A/F sensor 27 is an oxygen concentration sensor that outputs oxygen concentration detection signal at every moment in accordance with oxygen concentration in exhaust gas. The oxygen concentration detection signal as a sensor output of the A/F sensor 27 is adjusted so as to change linearly in accordance with the oxygen concentration. Instead of the A/F sensor 27, an electromotive force output type $O_2$ sensor, which outputs different electromotive force signals in accordance with rich or lean of exhaust air, may be used.

The variable valve timing mechanisms 23*a*, 24*a*, which change opening and closing timings of the intake valve 23 and the exhaust valve 24, respectively, are installed in the engine 10. Furthermore, an intake cam angle sensor 23*b* and an exhaust cam angle sensor 24*b*, which output cam angle signals in synchronization with rotations of an intake camshaft and an exhaust camshaft, are installed in the engine 10. A crank angle sensor 28, which outputs pulses of a crank angle signal for every predetermined crank angle (for every 30° CA, for example) in synchronization with a rotation of a crankshaft of the engine 10, is also installed in the engine 10. Moreover, a coolant temperature sensor 29 for detecting temperature of coolant that circulates mainly in the engine 10 is attached to a cylinder block 10*a* of the engine 10.

An ignition plug (not shown) is attached to the cylinder head of the engine 10 for every cylinder. High voltage is applied to the ignition plug at desired ignition timings through an ignition device that consists of an ignition coil etc. By application of the high voltage, spark discharge is generated between opposing electrodes of each ignition plug, to ignite air-fuel mixture introduced in the combustion chamber, and the air-fuel mixture is applied to combustion.

As commonly known, an ECU 40 is constituted with a microcomputer, which consists of a CPU, ROMs, RAMs, etc., as a main component. The ECU 40 grasps engine running state and driver's demand (such as an accelerator operation amount) based on respective detection signals etc., which are inputted from the above-mentioned sensors 13*a*, 15, 22, 23*b*, 24*b*, 27, 28 and from respective sensors mounted on the vehicle. Then, the ECU 40 performs respective controls correspondingly in accordance with a control program.

Specifically, the ECU 40 detects air-fuel ratio based on the oxygen concentration detection signal from the above-mentioned A/F sensor 27. Then, the ECU 40 calculates an air-fuel ratio correction coefficient FAF based on a difference between an air-fuel ratio, which is detected in this manner at every moment, and a target air-fuel ratio. Then, the ECU 40 performs a feedback control of the air-fuel ratio in which the next fuel injection quantity is set by multiplying a basic injection quantity by the calculated air-fuel ratio correction coefficient FAF. Therefore, in a case where the target air-fuel ratio is set to stoichiometric ratio (theoretical air-fuel ratio), if the detected air-fuel ratio shifts to rich side than the stoichiometric ratio, the ECU 40 decreases the air-fuel ratio correction coefficient FAF so as to keep the air-fuel ratio at the stoichiometric ratio, and decreases the next fuel injection quantity. If the air-fuel ratio shifts to lean side, the ECU 40 increases the air-fuel-ratio correction coefficient FAF to keep the air-fuel ratio at the stoichiometric ratio, and increases the next fuel injection quantity.

A memory such as an EEPROM, which the microcomputer of the ECU 40 has, memorizes a map that specifies a relation between the difference of the actual air-fuel ratio, which is detected by the A/F sensor 27, from the target air-fuel ratio and the air-fuel ratio correction coefficient FAF. A learning control is performed by updating the above-mentioned difference memorized in the map.

Moreover, the ECU 40 calculates a target fuel injection quantity by performing respective corrections of the basic injection quantity as described below. That is, the ECU 40 calculates the basic injection quantity based on an engine rotational speed, which is calculated from a detection value of the crank angle sensor 28, and engine load. The engine load is calculated from a throttle valve opening degree, which is calculated from the detection value of the throttle valve opening sensor 15, the intake air quantity, which is calculated from a detection value of the air flow meter 13, etc. The correction for the basic injection quantity includes an acceleration increase for improving acceleration response, an after-start increase, a warm-up increase, etc.

The feedback control of the air-fuel ratio is performed in a steady running in which the running state of the engine 10 is stable. For example, it is appropriate to determine that the engine 10 is in the steady running when all of following conditions (1)-(6) or at least one of the following conditions (1)-(6) is satisfied.

(1) No correction for the basic injection quantity such as the acceleration increase, the after-start increase and the warm-up increase is performed.

(2) An air intake pressure detected by the intake pipe pressure sensor 16 is between a lower limit value and an upper limit value.

(3) The engine rotational speed is, between a lower limit value and an upper limit value.

(4) The temperature of coolant detected by the coolant temperature sensor 29 is higher than a lower limit value.

(5) The temperature of intake air detected by the intake air temperature sensor 13*a* is higher than a lower limit value.

(6) The A/F sensor 27 is activated.

By the way, if the A/F sensor 27 becomes degraded with time by adhesion of PM (Particulate Matter) in exhaust gas to the A/F sensor 27 etc., accuracy of the above-mentioned feedback control of the air-fuel ratio falls, and the air-fuel ratio is deviated from the stoichiometric ratio. Then, it becomes difficult to control emission amount to be a target value or smaller. Therefore, it is important to determine degradation of the A/F sensor 27 with high accuracy. A method for determining presence and absence of degradation of the A/F sensor 27 will be described hereafter in detail with reference to FIGS. 2A-2D and FIG. 3. FIGS. 2A-2D are timing charts in which a horizontal axis indicates elapsed time and a vertical axis indicates air-fuel ratio. FIG. 3 is a flowchart showing a procedure of a process of the above-mentioned degradation determination performed by the microcomputer that the ECU 40 has (degradation determination apparatus).

First, in a time period in which the feedback control of the air-fuel ratio is performed, a dither control, which compulsively changes the air-fuel ratio alternately to rich side and to lean side by increasing and decreasing the target fuel injection quantity in a stepped manner, is performed. In an example shown in FIG. 2A, the target air-fuel ratio is compulsively changed to lean side at timings t10, t30, t50, and the target air-fuel ratio is compulsively changed to rich side at timings t20, t40, t60. Stepped changes of the target air-fuel ratio are performed twice or more (three times in the example shown in FIGS. 2A-2D) in a predetermined time (approximately 1 second in the example shown in FIGS. 2A-2D).

Figures 2A, 2B, 2C, 2D:
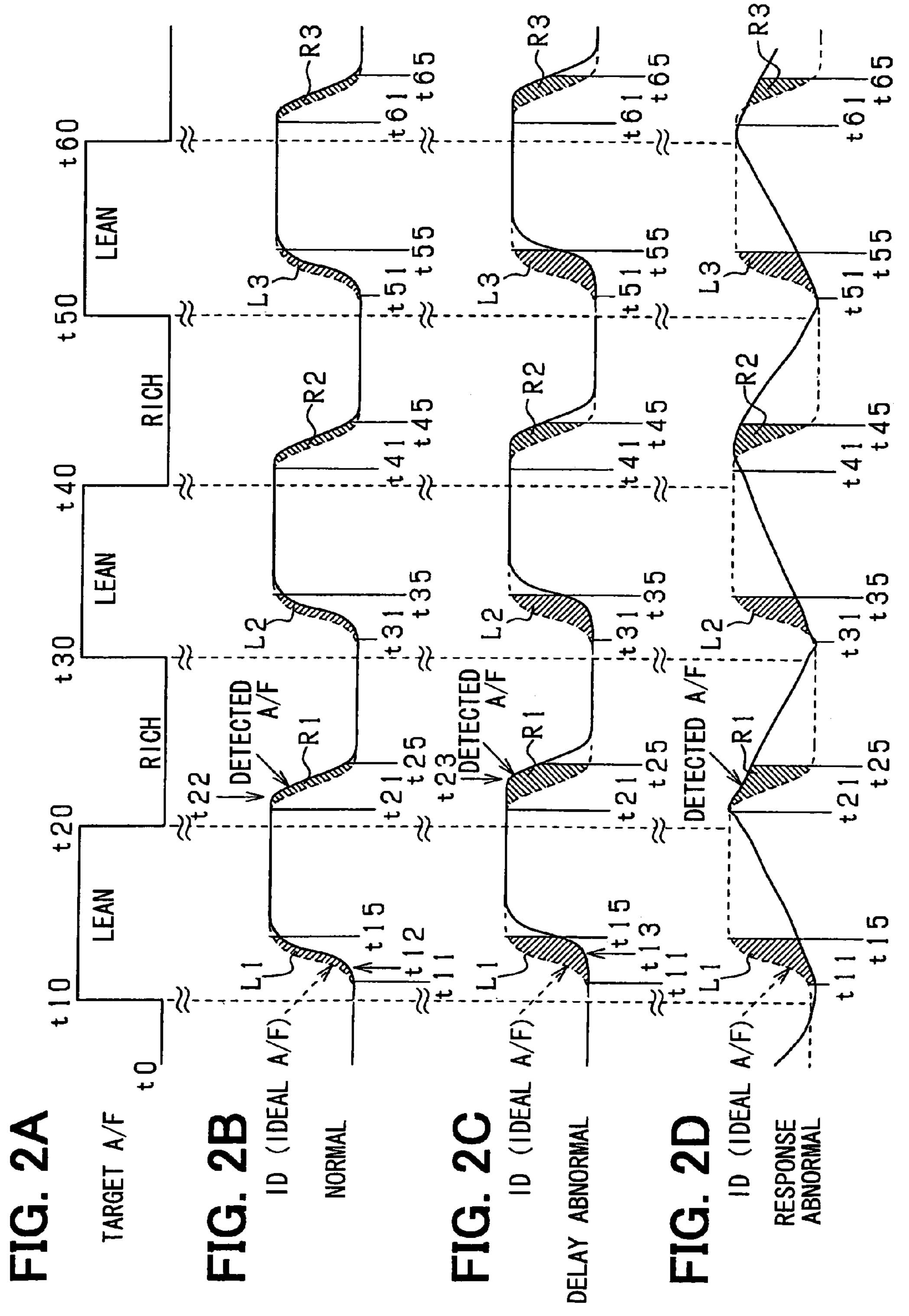
FIG. 2A is a diagram showing a target A/F value in the degradation determination apparatus according to the first embodiment.
FIGS. 2B-2D are diagrams showing detected A/F values in a normal state, in a delay abnormal state and in a response abnormal state, respectively, in the degradation determination apparatus according to the first embodiment.
Figure 3:
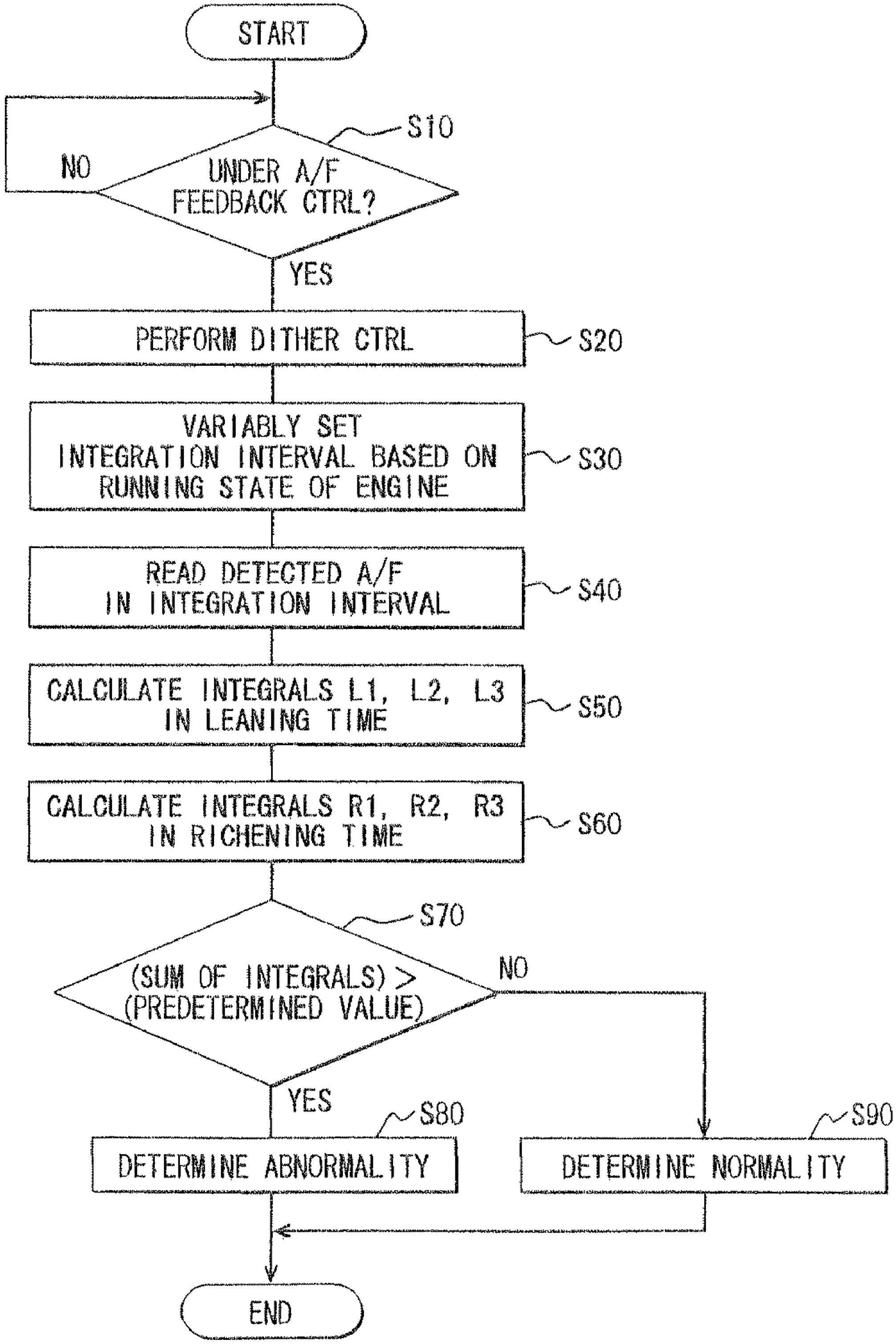
FIG. 3 is a flowchart showing a procedure of a degradation determination process by the degradation determination apparatus according to the first embodiment.

When such a dither control is performed, the air-fuel ratio detected by the A/F sensor 27 (detected A/F value) changes with a response delay after stepped changes of the target air-fuel ratio by the feedback control of the air-fuel ratio (see solid lines in FIGS. 2B-2D). Dotted-lines ID in FIGS. 2B-2D show predicted values (ideal A/F values ID) that indicate ideal changes of the detected A/F values in a case where the A/F sensor 27 is not degraded and is in a normal state. The ideal A/F value is previously memorized in ROMs (memorizing means) etc. of the microcomputer. The detected A/F values indicated by solid lines in FIGS. 2B-2D are shown on a condition where high-frequency noises, which are actually superimposed on the detected A/F values, are removed.

<Normal Case>

The detected A/F value shown in FIG. 2B is a value in a case of normal state where degradation of the A/F sensor 27 is within permissible range. In this case, A/F increase start timings are timings t12, t32, t52, which are slightly delayed from timings t11, t31, t51 of the ideal A/F value ID, and an increasing speed (gradient) of the detected A/F value is approximately equal to that of the ideal A/F value ID. In an analogous fashion, A/F decrease start timings are timings t22, t42, t62, which are slightly delayed from timings t21, t41, t61 of the ideal A/F value ID, and a decreasing speed (gradient) of the detected A/F value is approximately equal to that of the ideal A/F value ID.

<Delay Abnormal Case>

The detected A/F value shown in FIG. 2C is a value in a case of a delay-abnormal state where the degradation of the A/F sensor 27 has gone out of permissible range, and a response delay time of the detected A/F value from the stepped change of the target air-fuel ratio is longer than a permissible delay time. In this case, the A/F increase start timings are timings t13, t33, t53 that are delayed much from timings t11, t31, t51 of the ideal A/F value ID. In an analogous fashion, the A/F decrease start timings are timings t23, t43, t63 that are delayed much from timings t21, t41, t61 of the ideal A/F value ID. An increasing speed and a decreasing speed (gradients) of the detected A/F value are approximately equal to that of the ideal A/F value ID.

<Response Abnormal Case>

The detected A/F value shown in FIG. 2D is a value in a case of a response abnormal-state where the degradation of the A/F sensor 27 has gone out of permissible range, and an increasing speed and a decreasing speed of the detected A/F value since the detected A/F value has started a response to the stepped change of the target air-fuel ratio are slower than a permissible speed. In this case, the A/F increase start timings and the A/F decrease start timings are approximately equal to those of the ideal A/F value ID. However, the increasing speed and the decreasing speed (gradients) of the detected A/F value are slower than those of the ideal A/F value ID.

In this embodiment, an integral of the difference between the ideal A/F value ID (standard value) and the detected A/F value, which changes in accordance with the dither control, is calculated in predetermined integration intervals t11-t15, t21-t25, t31-t35, t41-t45, t51-t55, t61-t65. That is, diagonally shaded areas L1-L3, R1-R3 in FIGS. 2B-2D are calculated. When the A/F sensor 27 is in the normal state as shown in FIG. 2B, these areas (integral values) L1-L3, R1-R3 are small. When the A/F sensor 27 is in the delay abnormal state or in the response abnormal state as shown in FIGS. 2C, 2D, the areas L1-L3, R1-R3 are large. Accordingly, it is determined in this embodiment that the A/F sensor 27 is degraded and abnormal if the values L1-L3, R1-R3, which are obtained by integral calculations, are larger than a predetermined value.

Next, a procedure of a degradation determination process performed by the microcomputer will be described with reference to FIG. 3.

The process shown in FIG. 3 is performed every time a predetermined time period has elapsed or every time the vehicle has traveled a predetermined distance. First, at step S10, it is determined whether the above-mentioned feedback control of the air-fuel ratio is performed. If it is determined that the feedback control of the air-fuel ratio is performed (S10: YES), the above-mentioned dither control is performed at step S20 (dither control means). A reference numeral t0 in FIG. 2A indicates a timing for starting performing the dither control. The target air-fuel ratio starts changing in a stepped manner from this timing t0. Next, at step S30, integration intervals t12-t15, t22-t25, t32-t35, t42-t45, t52-t55, t62-t65 are variably set based on the running state of the engine 10. Specifically, the running state includes, for example, the engine load based on the accelerator operation amount by the driver, air intake amount, air intake pressure, etc., and the engine rotational speed.

Specifically, timings when a predetermined time is elapsed since timings t10, t30, t50 (leaning timings), at which the target air-fuel ratio is compulsively changed from rich side to lean side, are set as starting timings t12, t32, t52 of the integration intervals in the leaning time. Timings when a predetermined time is elapsed since timings t20, t40, t60 (richening timings), at which the target air-fuel ratio is compulsively changed from lean side to rich side, are set as starting timings t22, t42, t62 of the integration intervals in the richening time. These predetermined times are set in accordance with the engine running state so that the starting timings of the integration intervals would be timings when the ideal A/F value ID has changed as much as approximately 10% of a change (difference between the minimum value and the maximum value) of the ideal A/F value in accordance with the dither control. In other words, the above-mentioned predetermined times are set in accordance with the engine running state so that each integration interval would be within the leaning time period and the richening time period of the ideal A/F value ID.

Next, at step S40, the detected A/F value is read in the integration intervals that are set at step S30. Then, at step S50, a difference between the detected A/F value that is read at step S40 and the A/F desired value ID is calculated in the integration intervals in the leaning time, and the integral values L1-L3 in the leaning time are obtained. Moreover, at step S60, a difference between the detected A/F value that is read at step S40 and the A/F desired value ID is calculated in the integration intervals in the richening time, and the integral values R1-R3 in the richening time are obtained.

Next, at step S70 (degradation determination means), a sum of the integral values L1-L3, R1-R3 is calculated, and it is determined whether the sum is larger than a predetermined value. If the sum of the integral values is larger than the predetermined value (S70: YES), it is determined at step S80 (degradation determination means) that the A/F sensor 27 is in the degraded abnormal state which is exemplary shown in FIGS. 2C, 2D. If the sum of the integral values is equal to or smaller than the predetermined value (S70: NO), it is determined at step S90 that the A/F sensor 27 is in the normal state, which is exemplary shown in FIG. 2B.

The present embodiment, which has been described above in detail, produces the following effects.

(1) In a conventional apparatus that performs degradation determination based on a response time until the detected A/F value exceeds a threshold value, the response time, which affects the result of the determination of degradation of the A/F sensor, is much influenced by noises that are superimposed on the detected A/F value. In contrast, in the present embodiment, the integral of the difference between the detected A/F value, which changes in accordance with the dither control, and the ideal A/F value ID is calculated, and presence and absence of degradation of the A/F sensor 27 is determined based on the integral values L1-L3, R1-R3. In the present embodiment, the integral values L1-L3, R1-R3, which affects the result of the determination of degradation, are not so much influenced by the noises as the above-mentioned response time. Therefore, in determining the presence and absence of degradation of the A/F sensor 27, it is possible to improve accuracy of the degradation determination.

(2) In performing the integral calculations, the ideal A/F value ID, which indicates the ideal change of the detected A/F values, is used as the standard value. Therefore, if the A/F sensor 27 becomes degraded, the difference between the detected A/F value, which changes in accordance with the dither control, and the ideal A/F value ID becomes remarkably large. Accordingly, the values L1-L3, R1-R3 obtained by performing integral calculations become remarkably large, and it is possible to desirably improve the accuracy of the degradation determination.

(3) The degradation determination is performed based on the sum of more than two integral values L1-L3, R1-R3. Therefore, compared with a case where the degradation determination is performed based on one integral value, it is possible to reduce a possibility of performing an erroneous determination due to effects of noises. Moreover, the degradation determination is performed based on both the integral values L1-L3 in the leaning time and the integral values R1-R3 in the richening time. Therefore, compared with a case where the degradation determination is performed on either one of the integral values in the leaning time and the integral values in the richening time, it is possible to improve the accuracy of the degradation determination.

(4) The integration intervals t14-t15, t21-t25, t31-t35, t41-t45, t51-t55, t61-t65 for performing the integral calculations of the detected A/F value that changes in accordance with the dither control are variably set in accordance with the running state of the engine 10. Therefore, the integration intervals are variably set so that the integral values L1-L3, R1-R3 would greatly change in accordance with degradation of the A/F sensor 27. Accordingly, it is possible to enhance the accuracy of the degradation determination.

Second Embodiment

In the above-described first embodiment, the integral of the difference, between the detected A/F value and the standard value, which is the predicted value (ideal A/F value ID) that indicates the ideal change of the detected A/F values in a case where the A/F sensor 27 is not degraded, is calculated. In contrast, in this embodiment shown in FIGS. 4A-4D, after the dither control is started, a minimum value Bmin of the detected A/F value in time periods from the leaning timings t10, t30, t50 to the integral calculation start timings t11, t31, t51, and a maximum value Bmax of the detected A/F value in time periods from the richening timings t20, t40, t60 to the integral calculation start timings t21, t41, t61 are set as standard values.

Then, integrals of a difference between the standard values Bmin, Bmax, which are set in this manner, and the detected A/F value, which changes in accordance with the dither control, are calculated in the integration intervals t11-t15, t21-t25, t31-t35, t41-t45, t51-t55, t61-t65, which are set in an analogous fashion as in the first embodiment. That is, diagonally shaded areas L1-L3, R1-R3 in FIGS. 4B-4D are calculated.

Figures 4A, 4B, 4C, 4D:
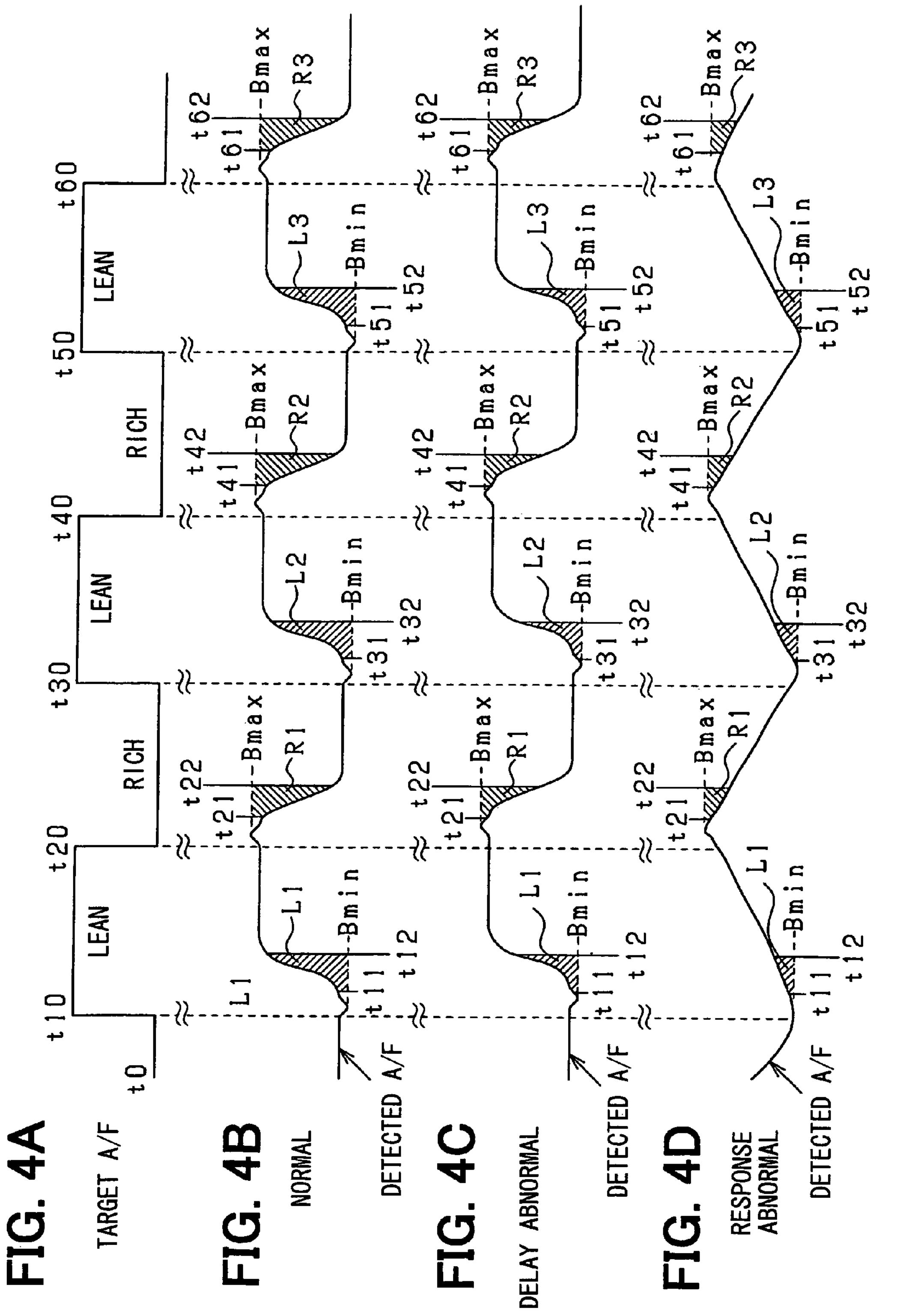
FIG. 4A is a diagram showing a target A/F value in a degradation determination apparatus according to a second embodiment of the present invention.
FIGS. 4B-4D are diagrams showing detected A/F values in a normal state, in a delay abnormal state and in a response abnormal state, respectively, in the degradation determination apparatus according to the second embodiment.

When the A/F sensor 27 is in the normal state as shown in FIG. 4B, these areas (integral values) L1-L3, R1-R3 are large. When the A/F sensor 27 is in the delay abnormal state or in the response abnormal state as shown in FIGS. 4C, 4D, the areas L1-L3, R1-R3 are small. Accordingly, it is determined in this embodiment that the A/F sensor 27 is degraded and abnormal if the values L1-L3, R1-R3, which are obtained by integral calculations, are smaller than a predetermined value. The present embodiment produces substantially the same effects as in the first embodiment.

Third Embodiment

Figures 5A, 5B, 5C, 5D:
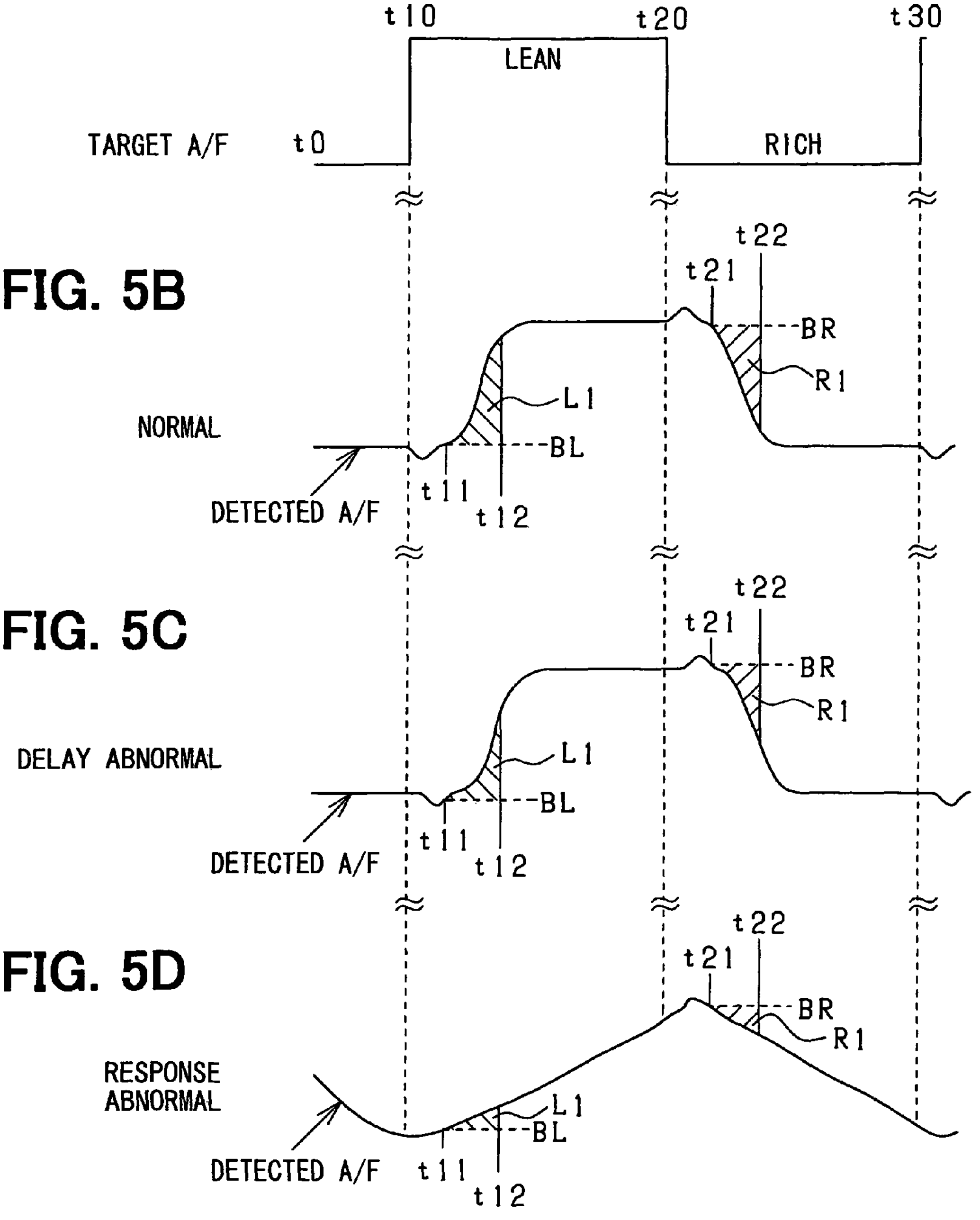
FIG. 5A is a diagram showing a target A/F value in a degradation determination apparatus according to a third embodiment of the present invention.
FIGS. 5B-5D are diagrams showing detected A/F values in a normal state, in a delay abnormal state and in a response abnormal state, respectively, in the degradation determination apparatus according to the third embodiment.

In this embodiment shown in FIGS. 5A-5D, the detected A/F values at timings t11, t21 when the integral calculation is started are set as standard values (see dotted lines BL, BR in FIGS. 5B-5D). Then, integrals of a difference between the standard values BL, BR, which are set in this manner, and the detected A/F value, which changes in accordance with the dither control, are calculated in the integration intervals t11-t15, t21-t25, t31-t35, t41-t45, t5'-t55, t61-t65, which are set in an analogous fashion as in the first embodiment. That is, diagonally shaded areas L1, R1 in FIGS. 5B-5D are calculated.

When the A/F sensor 27 is in the normal state as shown in FIG. 5B, these areas (integral values) L1, R1 are large. When the A/F sensor 27 is in the delay abnormal state or in the response abnormal state as shown in FIGS. 5C, 5D, the areas L1, R1 become small. In this regard, in this embodiment, it is determined that the A/F sensor 27 is degraded and abnormal when the values L1, R1, which are obtained by integral calculations, are smaller than a predetermined value. The present embodiment produces substantially the same effects as in the above-described first embodiment. Although not graphically represented in FIGS. 5B-5D, also in this embodiment, more than two integral values in the leaning time and richening time are calculated in an analogous fashion as in the above-described embodiments. The degradation determination is performed based on these more than two integral values.

Fourth Embodiment

In this embodiment, the target air-fuel ratio just before performing leaning by the dither control and the target air-fuel ratio just before performing richening are set as standard values. Then, integrals of a difference between the standard values, which are set in this manner, and the detected A/F value, which changes in accordance with the dither control, are calculated in the integration intervals t11-t15, t21-t25, t31-t35, t41-t45, t51-t55, t61-t65, which are set in an analogous fashion as in the first embodiment. Therefore, if the detected A/F value is equalized with the target air-fuel ratio, the values obtained by the integral calculation in this embodiment are equal to the areas L1, R1 in the above-described third embodiment. Also in this embodiment, it is determined that the A/F sensor 27 is degraded and abnormal if the values L1, R1 obtained by the integral calculations are larger than a predetermined value in an analogous fashion as in the third embodiment.

Other Embodiments

The above-described embodiments may be modified and put into practice as follows. Moreover, the present invention is not limited to the statements of the above-described embodiments, but may be arbitrary combinations of the characteristic configurations of the respective embodiments.

In the above-described embodiments, the degradation determination is performed based on the sum of the integral values L1-L3 in leaning times and the integral values R1-R3 in richening times. Alternatively, the accuracy of the degradation determination may be improved by performing the degradation determination based on a sum of either of the integral values L1-L3 and the integral values R1-R3.

For example, if it is previously known that the response delay due to degradation remarkably appears when the air-fuel ratio changes from rich side to lean side (in leaning times), the degradation determination is performed based on the sum of only the integral values L1-L3 in the leaning times. In contrast, if it is previously known that the response delay due to degradation remarkably appears when the air-fuel ratio changes from lean side to rich side (in richening times), the degradation determination is performed based on the sum of only the integral values R1-R3 in the richening times.

In the above-described embodiments, the degradation determination is performed based on the sum of more than two integral values L1-L3, R1-R3. Alternatively, the degradation determination may be performed based on one integral value L1, R1.

In the above-described embodiments, the degradation determination of the A/F sensor 27 is performed based on the integral values obtained by calculating integrals of the difference between the detected A/F value, which changes in accordance with the dither control, and the standard value. Alternatively, these integral calculations may be eliminated by performing the degradation determination as follows. That is, the predicted value (ideal A/F value ID), which indicates the ideal change of the detected A/F value in a case where the A/F sensor 27 is not degraded, is used as the standard value, and the degradation determination is performed based on the difference between the detected A/F value, which changes in accordance with the dither control, and the ideal A/F value ID.

For example, the difference between the detected A/F value and the ideal A/F value ID is calculated at more than two timings for each of the integration intervals t11-t15, t21-t25, t31-t35, t41-t45, t51-t55, t61-t65. Then, the degradation determination is performed based on an average value of more than two differences, which are obtained by these calculations.

In the above-described embodiments, the control apparatus according to the present invention is applied to injectors 18 mounted on a spark ignition gasoline engine. Alternatively, the control apparatus according to the present invention may be applied to injectors mounted on a self ignition diesel engine.

Additional advantages and modifications will readily occur to those skilled in the art. The invention in its broader terms is therefore not limited to the specific details, representative apparatus, and illustrative examples shown and described.

What is claimed is:

1. A degradation determination apparatus for an oxygen concentration sensor, which is used in an internal combustion engine that has a fuel injection valve for injecting fuel used for combustion and the oxygen concentration sensor is used for detecting oxygen concentration in exhaust gas and for effecting a feedback control of fuel injection quantity of the fuel injection valve to equalize an air-fuel ratio calculated from a detection value of the oxygen concentration sensor with a target air-fuel ratio, said degradation determination apparatus comprising:

a dither control means for performing a dither control, which compulsively changes the air-fuel ratio alternately to rich side and to lean side by controlling the fuel injection quantity of the fuel injection valve;

an integral calculation means for calculating an integral of a difference between the detection value of the oxygen concentration sensor, which changes in accordance with the dither control, and a previously memorized predicted value that indicates an ideal change of the detection value generated by the dither control; and a degradation determination means for determining presence and absence of degradation of the oxygen concentration sensor based on a value of the integral calculated by the integral calculation means.

2. The degradation determination apparatus for the oxygen concentration sensor according to claim 1, wherein the integral calculation means has at least one of a lean response calculation means, which calculates the integral of the difference in a time period where the air-fuel ratio changes from the rich side to the lean side, and a rich response calculation means, which calculates the integral of the difference in a time period where the air-fuel ratio changes from the lean side to the rich side.

3. The degradation determination apparatus for the oxygen concentration sensor according to claim 1, wherein the integral calculation means variably sets an integration interval for calculating the integral of the detection value in accordance with a running state of the internal combustion engine.

4. A degradation determination apparatus as in claim 1 incorporated within a system for an oxygen concentration sensor, said system further comprising:

said fuel injection valve that injects fuel used for combustion; and said oxygen concentration sensor that detects oxygen concentration in exhaust gas.

* * * * *